UNITED STATES PATENT OFFICE.

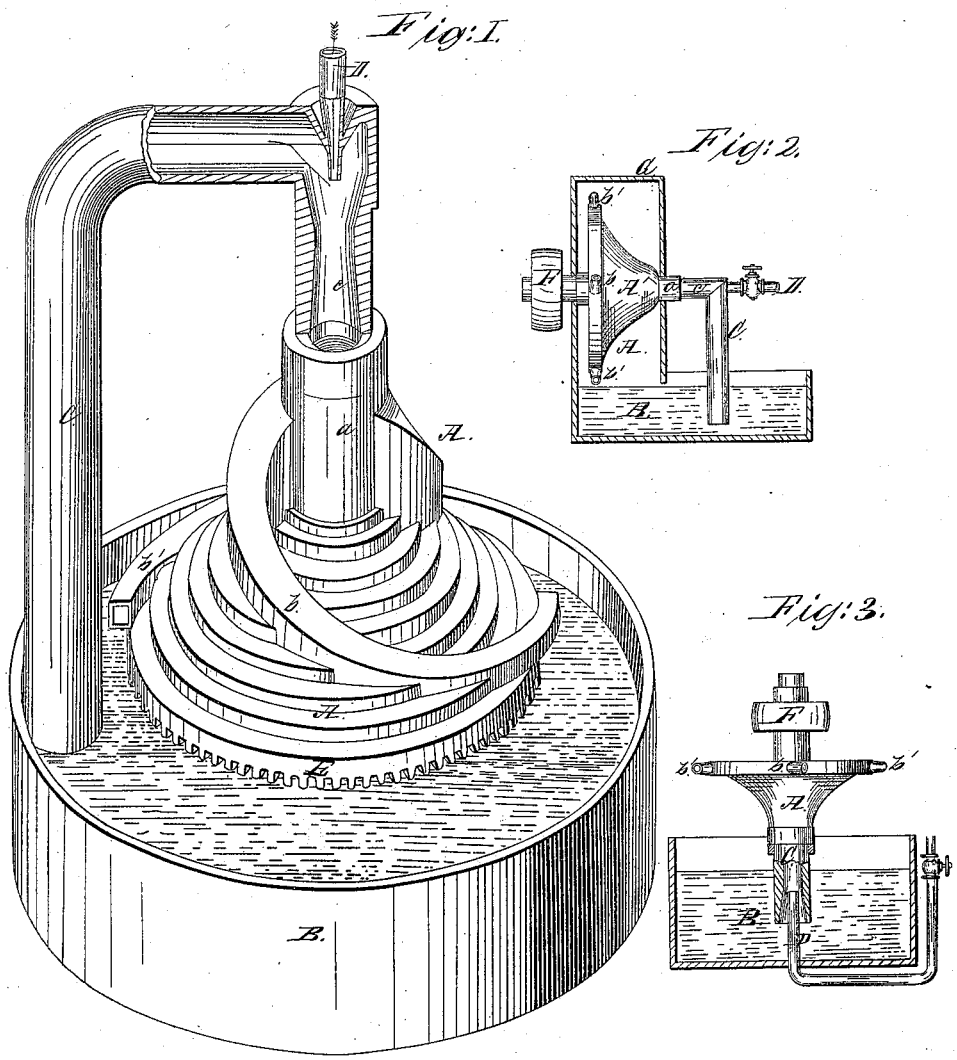

FRANK MILLWARD, OF CINCINNATI, OHIO, ASSIGNOR TO HIMSELF AND THOS. H. FOULDS, OF SAME PLACE.

IMPROVEMENT IN COMBINED STEAM AND WATER MOTOR.

Specification forming part of Letters Patent No. 54,469, dated May 1, 1866.

*To all whom it may concern:*

Be it known that I, FRANK MILLWARD, of Cincinnati, Hamilton county, State of Ohio, have invented a certain new and useful Motor; and I do hereby declare the following to be a full, clear, and exact description thereof, reference being had to the accompanying drawings, making part of this specification.

My invention relates to the employment of a reaction-wheel or turbine as a motor where a head and abundant supply of water is unavailable: and it consists in the application of steam (under pressure) in direct and immediate contact with the supply-water of the turbine, so as to partially or entirely produce a forcible stream of water.

In this connection my invention further consists of devices whereby the supply-water of the turbine can be taken wholly or in part from the tank or vessel into which the turbine discharges, so that there may be but little or no loss of water in the use of the motor.

In the accompanying drawings, Figure 1 is a perspective view of a motor embodying my invention. Figs. 2 and 3 are modifications of the same. The application of steam in both modifications is made by means of the well-known injector.

In Fig. 1, A is a reaction-wheel journaled vertically in a step in the bottom of a stationary water-tank, B, and on the end $c$ of the pipe C. The hollow center shaft, $a$, communicates with the discharge pipes or tubes $b\ b'$.

The wheel A may be what is known as the "Barker's mill," or it may be a turbine of the kind which discharges at or near its center; but I prefer the volute form of pipes $b\ b'$, as shown, the connection between the pipes and the hollow center shaft, $a$, being made by easy curves to give freedom of flow to the supply-water and facilitate the action of the injector.

To exhibit the shape of the pipes $b\ b'$ to the best advantage, Fig. 1 represents them secured to a step-cone, A'. The cone is provided at its base with a miter-wheel, E, for the transmission of the power of the wheel to machinery to be driven. In practice the pipes $b\ b'$ may be embedded in the cone A' and the whole wheel present a smooth surface to the surrounding atmosphere, as in the modifications, Figs. 2 and 3.

In Fig. 2 the wheel A is journaled horizontally in a jacket, G, and the power of the wheel is transmitted through pulley F, while in Fig. 3 the wheel is journaled vertically, but in a position the reverse to Fig. 1, the steam-nozzle being led through the bottom of the tank and entering the wheel from below. This modification dispenses with a siphon or angle pipe for supply, as in Fig. 1, and having no lift, water is forced at once, without any preliminary issue of steam at the turbine-discharge. In other respects the machines are identical, and the same letters of reference apply to both figures.

D is the steam-jet or nozzle pipe, forming with pipe $c$ the injector. C is the water-supply pipe connecting with the bottom of tank B, into which the wheel A discharges. When steam is admitted at pipe D a vacuum is created in pipe C and a forcible stream of water is produced, a complete circuit from tank B through pipes C $c$, shaft $a$, and pipes $b\ b'$, revolving the wheel A in the direction of the arrow, and discharging again into tank B, from which it is first received. As the injector will, in operation, increase the temperature of the water used and is not well adapted to inject at very high temperatures, it will in some cases be necessary (where a rapid circuit is produced and the tank B is small) to allow part of the tank-water to go to waste and to have an equivalent supply of cold water running into the tank.

To carry off vapor in starting, a jacket having a suitable escape-pipe may envelop the wheel A, Fig. 1, as in Fig. 2.

The connection between the stationary pipe $c$ and the revolving pipe $a$ can be packed or otherwise. The velocity of the stream will, however, be so great in most cases that there will be no leakage, even if the pipes were a little separated.

I do not wish to confine myself to the use of water and steam to operate the motor. Other liquids may be used in the wheel, the proper vapor thereof serving as a jet through pipe D. A central-discharge turbine, receiving water at or near its circumference, may be provided with as many injectors as there are inlets.

My improved motor is specially adapted to drive light machinery — sewing-machines, washing-machines, lathes, grist-mills, &c., by reason of its trivial first cost, its simplicity of construction, and its adaptability to start with ease and acquire a high velocity without the employment of multiplying gear.

Small machines, where a considerable number are used together in the same room or building, are usually driven by a single steam-engine; but it has been found so difficult to vary at will the speed of each machine independently of the others that in some cases preference has been given to the extremely costly attachment of a separate steam-engine to each machine, and even by this latter arrangement, unless the engine is a double or right-angle crank engine, it has to be pushed over centers to start.

The first cost of the motor herein described is so trifling that where gangs of machines are to be operated and variable speed required it will be found most advantageous and but little more costly to attach a motor to each machine. A single water-tank may supply the whole. The water is merely the medium of applying the power of steam to an entirely open turbine, whether of exterior or central discharge-pipe. The low momentum and high volatility of steam have hitherto made it inapplicable to open motors of any kind. The receiving-vessel, whether cylinder or otherwise, has had to be provided with tightly-closing valves, both at the receiving and at the delivering ends, in order to imprison the subtle agent until entirely done with it. It has been different with water, because its inertia has held it solidly and in an unbroken body within the turbine or other vessel, although both ends were wide open. This is believed to be the first instance in which the power of steam has been successfully and economically applied to run an entirely open and valveless motor.

I claim herein as new and of my invention—

1. A reaction water-wheel or turbine whose receiving end is provided with a nozzle for the discharge into said wheel of steam, substantially as and for the purpose set forth.

2. In the described combination with the reaction wheel or turbine A $b$ $b'$, the injector D $c$, substantially as set forth, and for the purpose specified.

3. The tank B and supply-pipe C $c$, in the described combination with the injector D $c$ and wheel A $b$ $b'$, as set forth, and for the purpose specified.

In testimony of which invention I hereunto set my hand.

F. MILLWARD.

Witnesses:
GEO. A. KNIGHT,
JAMES H. LAYMAN.